United States Patent [19]
Holthoff et al.

[11] 3,886,830
[45] June 3, 1975

[54] CUTTING DEVICES FOR SUBDIVIDING MOVING ELONGATED STOCKS

[75] Inventors: Helmut Holthoff, Glehn; Cyril Pazderka, Dusseldorf-Oberkassel, both of Germany

[73] Assignee: Firma Friedrich Kocks, Dusseldorf, Germany

[22] Filed: May 9, 1973

[21] Appl. No.: 358,651

[30] Foreign Application Priority Data
May 24, 1972  Germany............................ 2225118

[52] U.S. Cl..................... 83/285; 83/324; 83/327; 83/328; 83/329
[51] Int. Cl............................................. B23d 25/06
[58] Field of Search............ 83/327, 328, 321, 324, 83/329, 330, 285; 74/86

[56] References Cited
UNITED STATES PATENTS 3,269,245  8/1966  Elineau............................ 83/328 X
3,466,961  9/1969  Konovalov et al................ 83/328 X FOREIGN PATENTS OR APPLICATIONS
421,951  6/1934  United Kingdom.................. 83/324

Primary Examiner—J. M. Meister
Attorney, Agent, or Firm—Buell, Blenko & Ziesenheim

[57] ABSTRACT

In a cutting device for subdividing moving elongated stock especially strip, rod or tube rolled stock, a cutting tool is carried on a carrier arm which is the last lever in a linkage system which, when driven by rotation of one lever about a fixed axis causes the tool to describe a non-circular locus including a stock cutting path along which cutting tool speed can be synchronised with stock speed and the cutting tool kept perpendicular to the stock axis. The cutting device can be operated continuously with the cutting tool selectively operative or intermittently when comparatively small acceleration and retardation forces are involved even with high stock speed greater than 10m/sec, for example 20m/sec.

30 Claims, 18 Drawing Figures

CUTTING DEVICES FOR SUBDIVIDING MOVING ELONGATED STOCKS

The present invention relates to cutting devices for subdividing moving elongated stock, especially strip- or rod-shaped or tubular rolled stock.

In one form of such a cutting device each cutting tool is disposed on a free end section of a carrier arm by which, when in use, it is guided to and through the substance at least over the length of a stock cutting path at a speed synchronised with the speed of the stock.

Cutting devices for the above-mentioned purpose are known and are manufactured in various designs. Thus, for example, a cutting device is known in which the cutting tool is guided by a slide on a straight track extending parallel to the moving stock. The non-stationary parts of this cutting device move during cutting at a synchronised speed and in the same direction as the stock while the direction of movement is reversed after cutting is completed so that the non-stationary parts of this cutting device move back usually at an increased speed into the starting position along a straight line in a direction opposite that of movement of the stock.

Such a cutting device is only suitable with the stock is moving at a relatively low speed, especially if only short sections are to be cut from a length. The double reversal of the direction of movement necessitates considerable acceleration and deceleration which, when the stock is moving at higher speeds, lead to an unjustifiably high outlay for construction and driving technology.

In order to subdivide stock which is moving at a higher speed of up to 10m/sec, cutting devices have been constructed in which cutting tools in the form of circular saw blades are moved round a circular track. This construction does away with the double reversal of the direction of movement so that more favourable acceleration and deceleration values are obtained and the circular track also makes construction of the cutting device simpler and more advantageous.

However, even this known construction is unable to subdivide stock which is moving at a speed much greater than 10m/sec. This is because when the stock is moving at higher speeds, for example 20m/sec, extremely high centrifugal forces arise at the revolving carrier arm so that substantial structural difficulties occur which have not yet been solved satisfactorily. With such high stock speeds a very high cutting performance is required from the cutting tool owing to the extremely short cutting time available. Such a high cutting performance can only be obtained at the cost of low service life of the cutting tool which is very uneconomical. The cutting force is also very great with such high cutting performances resulting in undesirable deformation of the stock. Furthermore, the acceleration and deceleration torques of the cutting device are very high, these torques being necessary for bringing the saw during start-stop operation up to the required high synchronised speed with the moving stock.

High acceleration and deceleration torques must also be provided moreover during the actual cutting process owing to the so-called "cos $\alpha$ - follow-up". This cos $\alpha$ - follow-up involves a speed correction carried out during the cutting process, for example for regulating by speed of the driving motor, and is necessary owing to the circular path of the cutting tool. With a circular path, a constant angular velocity and a constant peripheral speed, the cutting tool has a speed component in a direction parallel to the direction of movement of the stock which varies throughout the circular path. If V represents the peripheral speed of the cutting tool along the circular path, the above-mentioned speed component is $$V_1 = \frac{V}{\cos \alpha}$$

In the cutting zone, however, the speed component $V_1$ must be equal to the speed of movement of the stock $V_G$ so that $$V_1 = V_G = \frac{V}{\cos \alpha}$$
$$V = V_G \cdot \cos \alpha$$

The peripheral speed of the saw on the circular path must accordingly be reduced in the first half of the cutting zone and increased in the second half of the cutting zone, and this speed variation is referred to as cos $\alpha$ - follow-up. The higher the speeds of movement of the stock, the greater are the torques which have to be provided and which are required for the cos $\alpha$ - follow-up. Finally the known cutting device having a circular path has the disadvantage that it takes up a great deal of room perpendicular to the longitudinal axis of the moving stock since the diameter of the circular path must be relatively great with regard to the required minimum length of the cutting zone.

According to the present invention, there is provided a cutting device for subdividing moving elongated stock, especially strip- or rod-shaped or tubular rolled stock, in which each cutting tool is disposed on a free end section of a carrier arm which, when in use, describes a locus and by which it can be guided to and through the stock at a speed which at least over the length of a stock cutting path is synchronised with the speed of the stock, the carrier arm is the last lever in a linkage system of at least two levers, all of which are effectively in the same plane, and which are pivotally connected one to another whilst only one end of only a first lever of the linkage system is mounted for rotation about a fixed axis, a second lever in the linkage system is pivotally connected to the first lever about a common pivotal axis, and additional guide means are coupled to the second lever so that, when in use, the first lever, and with it the common pivot axis, is rotated in a circular path about the fixed axis of rotation whilst part of the second lever in the region of the common pivotal axis also is rotated in the circular path but in addition is caused by the additional guide means to pivot about the rotating common pivotal axis.

With a cutting device embodying the present invention it is possible to move a cutting tool disposed on the carrier arm on a closed circuit, the locus, which is particularly suitable for the present purpose. Loci can thereby be produced which are either only slightly curved or are not at all curved in the stock cutting path or zone and which therefore make possible a relatively long cutting zone. The enlargement of the cutting zone, which is achieved mainly by the slight curving of the loci produced, has the substantial advantage that a longer time is available for the cutting section so that only a lower cutting performance is required. However it can also be said that an optimum speed of the stock can be determined from the maximum, economically justifiable cutting performance of the cutting tool. In so doing, the cutting force can remain advantageously relatively low so that deformation of the stock need not occur.

A construction according to the present invention also has the advantage that only slight centrifugal forces arise at the carrier arm because in the cutting zone, where the tool moves at a high speed, the circuit has only a slight or no track curvature, while sharp track curvatures are located in the region of the circuit where there are only low peripheral speeds and the cutting tool is no longer in a cutting position.

A cutting device according to the present invention can also rotate at a relatively low speed relatively to the speed of the stock compared with the known cutting devices. The lower speed is the result of the greater radius of curvature of the circuit in the cutting zone and the greater time interval which is available as a result. This in turn means that during start-stop operation only substantially lower acceleration and deceleration torques are advantageously required. A construction according to the invention also enables loci to be produced which have relatively small dimensions perpendicular to the direction of movement of the stock so that little room is taken up in this direction.

The above-mentioned advantages of constructions according to the present invention may be realised also with three or more levers in the linkage. Generally, however, two levers are sufficient, one of them being the carrier arm for the cutting tool. With a view to a simple construction the levers of the linkage system are preferably disposed not exactly but only substantially in a common plane, meaning that they extend in substantially parallel planes a slight distance away from one another.

In one preferred embodiment of the invention, the additional guide means comprises a toothed guide wheel rotatable about the common pivotal axis between the first and second levers and to which the second lever, which is preferably the carrier arm, is connected in a non-rotating manner, and a toothed wheel or ring gear which is disposed concentrically about the fixed axis of rotation, and is fixed during normal operation, and by which the guide wheel is driven either as a result of rotation of the first lever or as a result of rotation of the toothed wheel or ring gear about the fixed axis of rotation. If the guide wheel is in direct engagement with it, the toothed wheel or ring gear which is fixed during normal operation is internally toothed. On the other hand, it is, however, also advantageous if the guide wheel is in indirect engagement with it, for example, through at least one intermediate gear wheel or ple, through at least one chain or belt drive, for the wheel or ring gear which is fixed during normal operation to be externally toothed. The first-mentioned embodiment is a relatively simple construction having relatively few individual parts, whilst the second embodiment makes it possible to determine the length of the first lever more freely. In both embodiments both internally and externally toothed fixed wheel or ring gear are fundamentally feasible structurally but, owing to the consequent reversal in the direction of rotation, loci are obtained in individual cases which are usually less advantageous, or an additional wheel would have to be provided for reversing the direction of rotation.

No matter which of the above-mentioned possibilities are used, it is preferable that the transmission ratio between the wheel or ring gear which is fixed during normal operation and the guide wheel should be 2:1 or 3:2 or 4:3. By means of these transmission ratios curve shapes are obtained which have generally been proved to be particularly advantageous, although on principle other transmission ratios can be used. With a transmission ratio of 2:1 usually an elliptical locus is obtained, of which one of the slightly curved sections is used as a cutting zone. With a transmission ratio of 3:2 a locus is obtained which approximately corresponds to an equilateral triangle having rounded-off corners, while with a transmission ratio of 4:3 a locus is obtained which essentially takes the form of a square having rounded-off corners.

According to a further feature of the invention, the lengths of the first and the second levers are such that the ratio of their lengths is from approximately 1:1.1 to 1:16.5. These length ratios have proved particularly advantageous. The particular ratio that is chosen depends upon the dimensions of the stock to be cut, but especially upon the selected transmission ratio between the fixed wheel or ring gear and the guide wheel. An elliptical locus requires a length ratio of the levers of approximately from 1:1.1 to 1:3. For a substantially triangular locus length ratios from 1:7.5 to 1:12 are recommended. If on the other hand an approximately square locus is selected, it is recommended that the levers be dimensioned according to a ratio from 1:11.5 to 1:16.5.

With the elliptical loci there is, however, a special case which has particular advantages. According to another preferred embodiment of the invention, the transmission ratio between the wheel or ring gear rim which is fixed during normal operation and the guide wheel is 2:1 and the lengths of the first and the second levers are equal. In this embodiment, the small half axis of the locus curve has become equal to zero so that the locus is a straight line. Despite a rotating drive a straight line or parallel plane guiding of the cutting tool relative to the direction of movement of the stock is achieved. This embodiment too has many of the previously mentioned advantages and in particular has the advantage of "straight line" guidance of the cutting tool, which facilitates the guiding and support of the stock in the cutting zone which from the point of view of construction can be economically designed.

It is generally the case that, when the first lever is rotated at a constant speed such that the return speed when the cutting tool is disengaged is the same as the forward speed when the cutting tool engages the stock and thus, apart from the cos α - follow-up, is also the same as the speed of movement of the stock, the cutting length of the stock is constant. In order to obtain other random cutting lengths, it is sufficient to increase or decrease the drive speed of the first lever during the time when the tool is disengaged.

In all the above-mentioned embodiments it is possible for the wheel or ring gear which is fixed during normal operation to be rotatable about its centre and, therefore, about the fixed axis of rotation, and to be lockable in any position. Thus it is possible to alter in particular the location of the locus relative to the path of the stock and thereby obtain optimum cutting ratios. With an elliptical locus, for example, it is recommended that the longer main axis be at an angle of approximately 6° to the longitudinal axis of the stock. Depending upon the nature of the stock other angles may be selected. The same applies for the other possible loci.

In a further embodiment of the invention, the additional guide means comprises a pivoted guide bearing which is fixed during normal operation, and an extension arm of the second lever, which extends beyond the pivotal axis common to the first and second levers and which is pivotably and axially displaceably supported in the pivoted guide bearing, the second lever preferably being the carrier arm. In this case a conchoid which is substantially kidney-shaped is obtained as a locus. An advantage of this embodiment is that the rates of acceleration and deceleration are relatively low which is significant especially when the stock is moving at high speeds. A construction according to this embodiment can have relatively small dimensions whilst at the same time providing a relatively large cutting path and almost straight line guidance for the cutting tool in the cutting zone. Lengthening the cutting section means increasing the cutting time and thereby reducing the specific load on the cutting tool. The follow-up zone is moreover particularly small. The conchoidal locus also prevents the cutting tool from moving in the opposite direction relative to the stock. Finally, this embodiment has also the advantages of the straight line cutting tool guide.

It has proved advantageous if the pivoted guide bearing is adjustable towards or away from the axis of the moving stock. By this means it is possible to change the shape of the conchoidal locus. It is furthermore advisable to make the pivoted guide bearing adjustable in a direction approximately parallel to the axis of the moving stock. In this way the location of the conchoidal locus can be altered relative to the moving stock. Changing the shape and location of the locus serves to change the location and length of the cutting zone. In a further embodiment of the invention, the plane of the coupling system may extend in or parallel to a plane extending through the longitudinal axis of the moving stock. It is also possible for the plane of the linkage system, regarding the cutting device in cross-section and/or in a side view, to extend at an angle to the plane extending through the longitudinal axis of the moving stock. It is also possible for the plane of the linkage system, regarding the cutting device in cross-section, to extend substantially perpendicular to the plane extending through the longitudinal axis of the moving stock. A cutting device embodying the present invention can be disposed in almost any desired position relative to the moving stock and can be readily adapted to all local spatial conditions. Neither is it absolutely essential for the stock which is to be cut to move horizontally; it can move in any direction.

When a cutting device is operated intermittently on a start-stop basis it is preferable for the stop point of the cutting tool and the carrier arm to be in a region of the locus in which these parts have their lowest speed. The acceleration and deceleration torques which then need to be provided by the drive are consequently at their lowest when starting and stopping the cutting device. Thus it is recommended, for example, with an elliptical locus that the cutting device be stopped in the region of the vertices of the large half axes.

In all embodiments of the invention it is advisable to connect each cutting tool to a straight line or parallel plane guiding device for alignment at the carrier arm into its cutting direction relative to the stock. Such a straight line or parallel plane guiding device can ensure that the tool, for example a saw blade, always encounters the moving stock at right angles thereto. This device can be constructed in various ways in dependence particularly upon the construction of the linkage system. In a preferred arrangement the straight line guiding device has a setting wheel, which is disposed coaxially with the fixed axis of rotation and is stationary during normal operation, and a swivel wheel which is connected in a non-rotational manner to a rocking shaft supporting the tool on the carrier arm, and between such wheels non-slip transmission means for transmitting rotational movement extending from the setting wheel along the first lever towards the common pivotal axis between the first and second levers, along said axis and along the second lever, which is preferably the carrier arm, to the swivel wheel, the transmission ratio between the setting wheel and the swivel wheel being 1:1.

In one embodiment in which a guide wheel is provided as additional guide means, the straight line guiding means can take a simpler form. In this case, the straight line guiding device has a setting wheel which is disposed coaxially with the common pivotal axis between the first and second levers and is connected in a non-rotational manner to the first lever, and a swivel wheel which is connected in a non-rotational manner to a rocking shaft supporting the tool on the carrier arm, and between such wheels non-slip transmission means for transmitting rotational movement extending from the setting wheel along the carrier arm to the swivel wheel, the transmission ratio between the setting wheel and the swivel wheel corresponding exactly to the inverse ratio between the wheel or ring gear which is stationary during normal operation and the guide wheel. In this case, the transmission means which otherwise had to be guided along the first lever are superfluous and can be omitted. Gear wheels and shafts as well as toothed belts or chains can be used as non-slip transmission means. Several pivot joints may alternatively be provided instead of only one rocking shaft.

It is furthermore advantageous if an additonal adjusting device can act on the straight line guiding device and by actuating the rocking shaft swivel the cutting tool through a limited angle out of its cutting position. This angle can be, for example, 90°. When the tool is swivelled away, the cutting device can effect one or more idle strokes which may be desirable when the stock is temporarily at a stand-still and also in the case of relatively large cutting lengths. The cutting lengths can then be determined by the ratio of the rotational speed of the cutting device to the speed of movement of the stock. The adjusting device preferably can act on the setting wheel of the straight line guiding device. This makes construction of the adjusting device simpler because the setting wheel is stopped during normal operation so that the adjusting device need not be moved either. A hydraulic cylinder, an electromagnet or other mechanical transmission elements having a corresponding drive may be used for the adjusting device.

In various embodiments of the invention, in particular in those having an effectively straight line portion of the locus in the cutting zone, a special feeding device is preferably disposed on the carrier arm for moving the tool into and out of a cutting position and/or for effecting the cutting feed, the tool being movable relative to the carrier arm by means of said feeding device. In this case too, there are numerous structural possibilities, hydraulic feed cylinders being recommended in particular.

In a further form of the invention, two synchronised linkage systems which are disposed on opposed sides of the stock to form a so-called "flying shears" may be provided. This embodiment is specially recommended when the cutting tools take the form of shearing blades. In this case a shearing blade is disposed on each coupling system. In the majority of cases, however, a circular saw blade is used as a cutting tool.

The invention will be further described, by way of example, with reference to the accompanying drawings in which several embodiments of the invention are illustrated, and in which.

Figure 1:
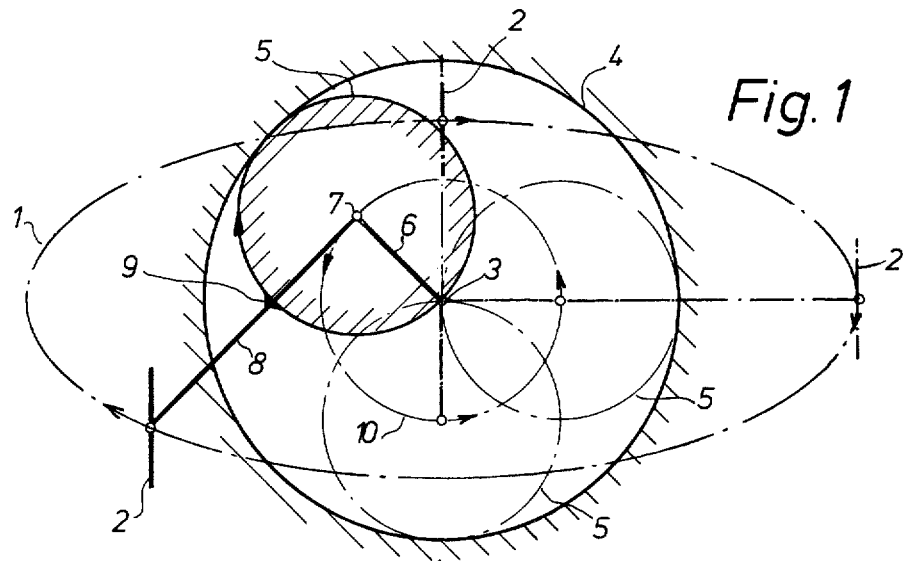
FIG. 1 is a schematic representation of a linkage drive system of an internal gear rim in mesh with an external drive gear according to this invention.

In FIG. 1, 1 denotes a locus having the form of an ellipse and illustrating a path on which a circular saw blade 2 moves, the latter only being illustrated diagrammatically. The saw blade 2 is depicted in altogether three points on the locus 1 in order to illustrate the individual positions on the locus.

The locus 1 is defined by a linkage system and has a fixed axis of rotation 3, about which there is concentrically disposed an internally toothed wheel 4 or ring gear which is stationary during normal operation. An externally toothed guide wheel 5 rotates inside the wheel 4 and is in engagement therewith. The guide wheel 5 is supported on a first lever 6, whose end section is supported on the fixed axis of rotation 3 and which, driven by a drive (not shown in FIG. 1) rotates about the axis of rotation 3. Consequently, the guide wheel 5 also rotates about the axis of rotation 3 and is in mesh with the fixed wheel 4. The arrows in the drawing indicate the directions of rotation. The guide wheel 5 is supported at the second end section of the first lever 6 by a bearing 7 which at the same time forms the common pivotal axis between the first lever 6 and a second lever 8 which is also the carrier arm for the saw blade 2. The carrier arm 8 is connected in a non-rotational manner to the guide wheel 5, this being symbolised by a weld illustrated at 9. As a result of the common pivotal axis 7 rotating on a circular path 10 about the stationary axis of rotation 3 and as a result of the guide wheel 5 meshing with the fixed wheel 4 and the rigid connection of the lever 8 to the guide wheel 5, the free end section of the carrier arm 8 carrying the saw blade 2 describes the elliptical locus 1. The locus 1 takes on elliptical form because the transmission ratio between the fixed wheel 4 and the guide wheel 5 acts as 2:1. In order to make the previously described rotational movement clear, two other positions of the coupling system are shown in dash-dot lines.

Figure 2:
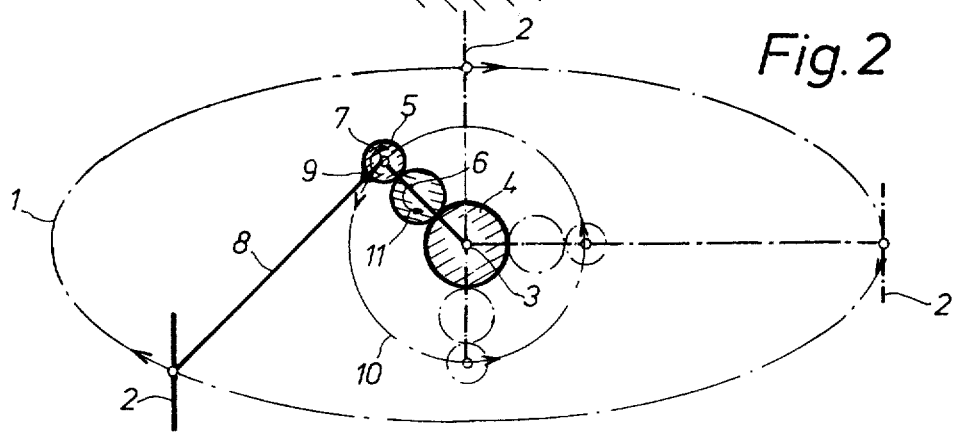
FIG. 2 is a schematic representation of a second embodiment of linkage system using an idler gear with an external drive gear according to this invention.

FIG. 2 shows the same elliptical locus 1 but the linkage system is of a different structure. Instead of having internal teeth, the fixed wheel 4 in this case is externally toothed and the guide wheel 5 does not mesh directly with the teeth of the fixed wheel 4 but meshes indirectly by way of an intermediate wheel 11. Like the guide wheel 5, the intermediate wheel 11 is supported on the first lever 6. The intermediate wheel 11 is only used to transmit the meshing movement and to reverse the direction of rotation without affecting the transmission ratio between the fixed wheel 4 and the guide wheel 5. This transmission ratio should again be 2:1 so that the locus 1 is an ellipse.

Figure 3:
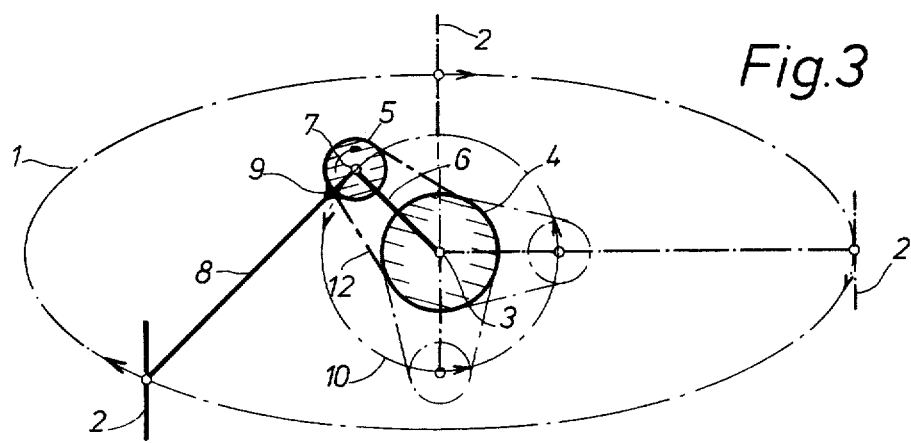
FIG. 3 is a schematic representation of a third embodiment of linkage system using a chain or toothed belt with an external drive gear according to this invention.

The embodiment of FIG. 3 differs from the embodiment of FIG. 2 only in that the linkage system uses a chain or gear belt drive 12 instead of the intermediate wheel 11. Otherwise FIGS. 1, 2 and 3 correspond to one another. For this reason identical reference numerals have been used for identical parts.

Figure 4:
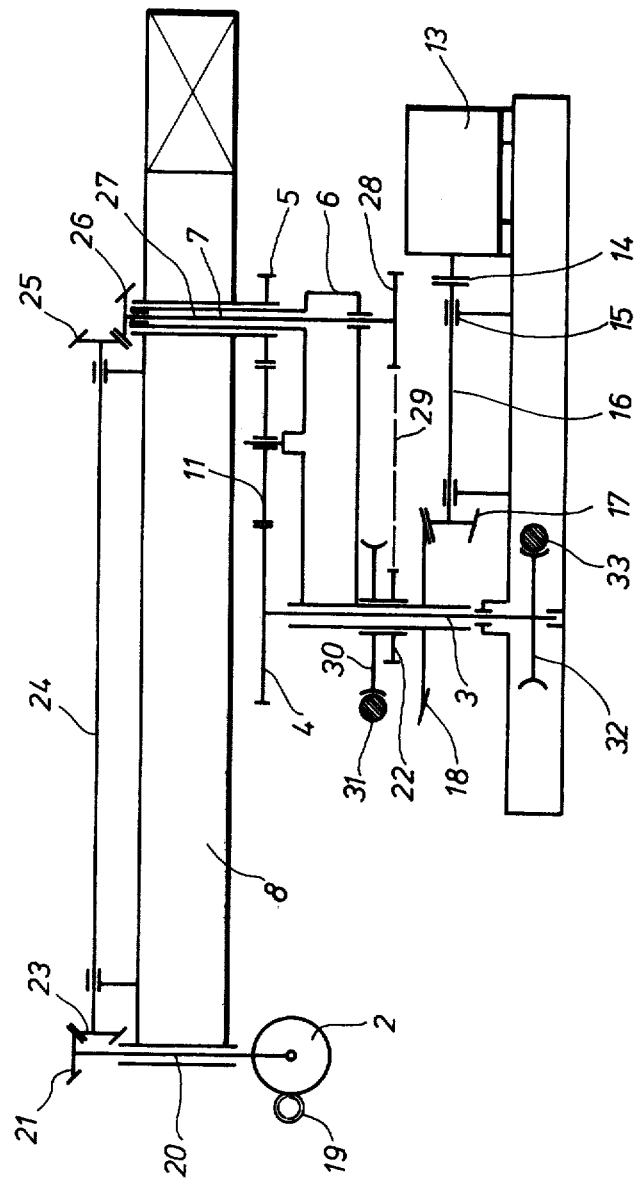
FIG. 4 is a diagrammatic vertical cross-section of an embodiment including the system of FIG. 2 and having a straight line or parallel plane guiding device, a device for adjusting the angle of the cutter relatively to the longitudinal axis of the stock and means for adjusting the locus of the cutter relatively to the path of the stock.

A cutting device embodying the linkage system of FIG. 2 is illustrated in FIG. 4. The linkage system is driven by a variable speed motor 13. A drive shaft 16 held by bearings 15 is driven through a coupling 14 and through a pair of bevel gears 17 and 18 drives the first lever 6 which rotates about the stationary axis of rotation 3. The carrier arm 8 would also effect this rotational movement were it not induced by means of the fixed wheel 4, the intermediate wheel 11 and the guide wheel 5 into an additional rotational movement about the pivotal axis 7 common to both levers 6 and 8. Owing to the resulting locus 1, the saw blade 2 is moved along the stock 19 which may be, for example, a pipe. When the speed of the driving motor 13 is regulated accordingly, the saw blade 2 and the stock 19 can move in synchronism so that the moving stock can be cut. Feed movement of the cutting tool 2 is obtained by the bent shape of the locus 1.

So that the saw blade 2 can always encounter the stock 19 in the position illustrated in FIG. 4 perpendicular to the longitudinal axis of the stock 19 and can be aligned in this position relative to the stock 19 throughout an entire cutting operation, preferably even throughout the entire rotational movement of the coupling system, a cutting device has a straight line or parallel plane guiding device which comprises several components. The saw blade 2 is supported from the carrier arm 8 by a rocking shaft 20. The rocking shaft 20 carries a swivel wheel 32 which is connected by nonslip transmission means to a setting wheel 22. The nonslip transmission means comprise a bevel gear 23, a transmission shaft 24, which extends along the carrier arm 8, a pair of bevel gears 25 and 26, a shaft 27 concentric with the common pivotal axis 7, a chain wheel 28, which is disposed on the shaft 27 in a non-rotational manner, and a chain 29 which connects the chain wheel 28 to the setting wheel 22. The transmission ratio between the setting wheel 22 and the wheel 21 is 1:1.

During normal operation the setting wheel 22 is stationary, being held in position by a regulator wheel 30 connected to it in a non-rotational manner. The regulator wheel 30 may, for example, take the form of a worm wheel so that it, and with it the setting wheel 22, can be turned by means of a worm. A hydraulic cylinder, an electromagnet or another unit can be used in its place. When the setting wheel 22 is stationary the wheel 21 and the rocking shaft will not rotate about their axis even through their axis is moved in space along the locus 1 by the carrier arm 8; the saw blade 2 will remain always in one of a series of parallel planes so that when the blade 2 and the stock 19 are moving in synchronism, movement of the saw blade 2 relative to the stock 19 will be along a straight line. If one wishes to disengage the saw blade 2 to allow the stock 19 to run through without being cut, it is sufficient to swivel the saw blade through 90°. The setting wheel 22 must also be rotated round 90° which can be effected by suitably rotating the wheel 30 by means of the worm 31. The worm 31 can be driven by means of a servomotor which is not shown in detail.

The setting wheel 4, which is stationary during normal operation, can also be rotated by means of a regulator wheel 32 and a driven worm 33. It is usually rotated through a few degrees so that the position of the locus 1 can be altered relative to the stock 19. Once the desired position is set, the wheel 4 is held by the then stationary worm 33 by way of the regulator wheel 32.

Figure 5:
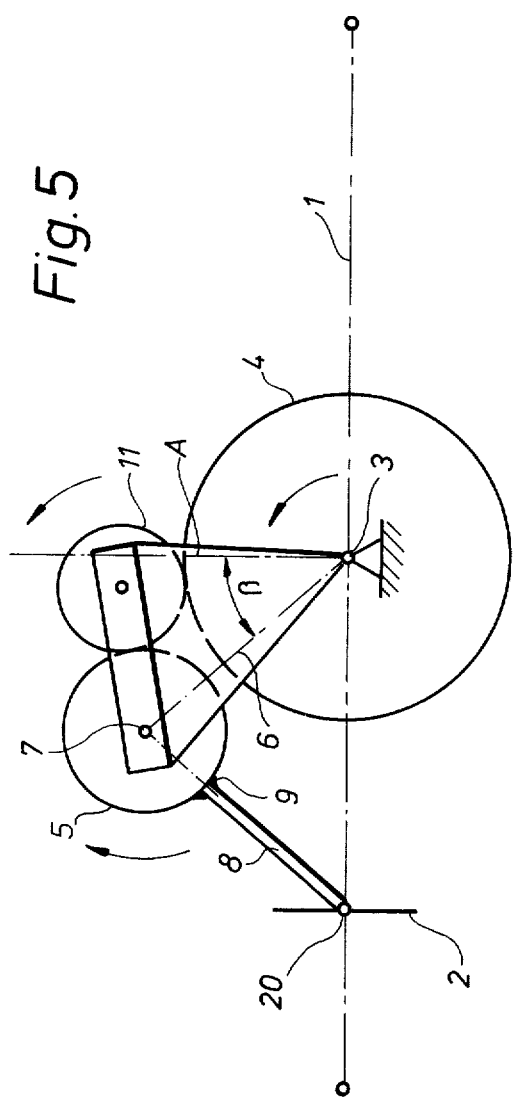
FIG. 5 is a plan view of another embodiment similar to those of FIGS. 2 and 4.

FIG. 5 shows diagrammatically an embodiment of one particular case of the linkage of FIG. 2 in which the distances between the fixed axis of rotation 3 and the common pivotal axis 7 on the one hand and between the latter and the rocking shaft 20 of the saw blade 2 on the other hand, i.e. the lengths of the levers 6 and 8, are identical. With a transmission ratio between the wheel 4 and the guide wheel 5 of 2:1, a locus 1 is produced which is a straight line. The length of the locus 1 is four times the length of a lever.

Figure 6:
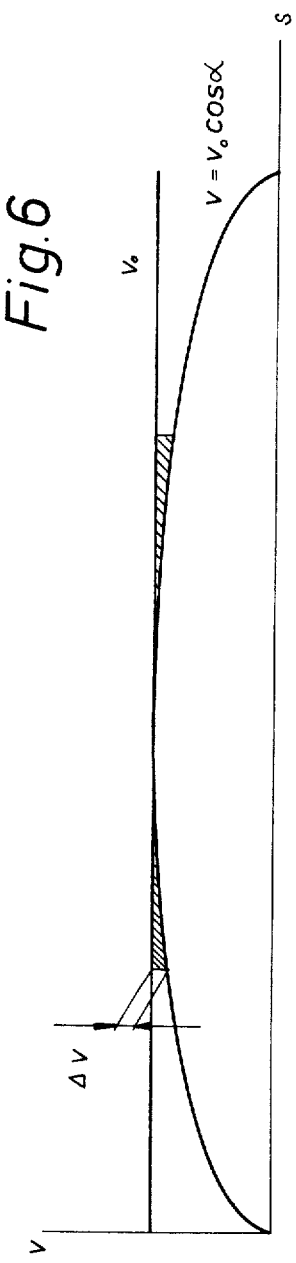
FIG. 6 is a speed-travel diagram for the embodiment of FIG. 5.

FIG. 6 is a speed-travel diagram which shows that the speed at the end points of the locus 1 in the embodiment of FIG. 5 is zero and that it rises to a maximum towards the centre of the locus 1 and in the relation $V = V_0 \times \cos \alpha$.

If only a part of the stroke is used for a cutting process, for example the angle $\beta$ on both sides of the vertical A and angle $\beta$ is dimensioned as 30°, a drop in speed $\Delta V$ of only 13.4 percent is obtained. Only this slight drop in speed must be compensated by the electrical follow-up of the driving motor 13. Shortening of the stroke can be compensated by correspondingly lengthening the levers 6 and 8.

Figure 7:
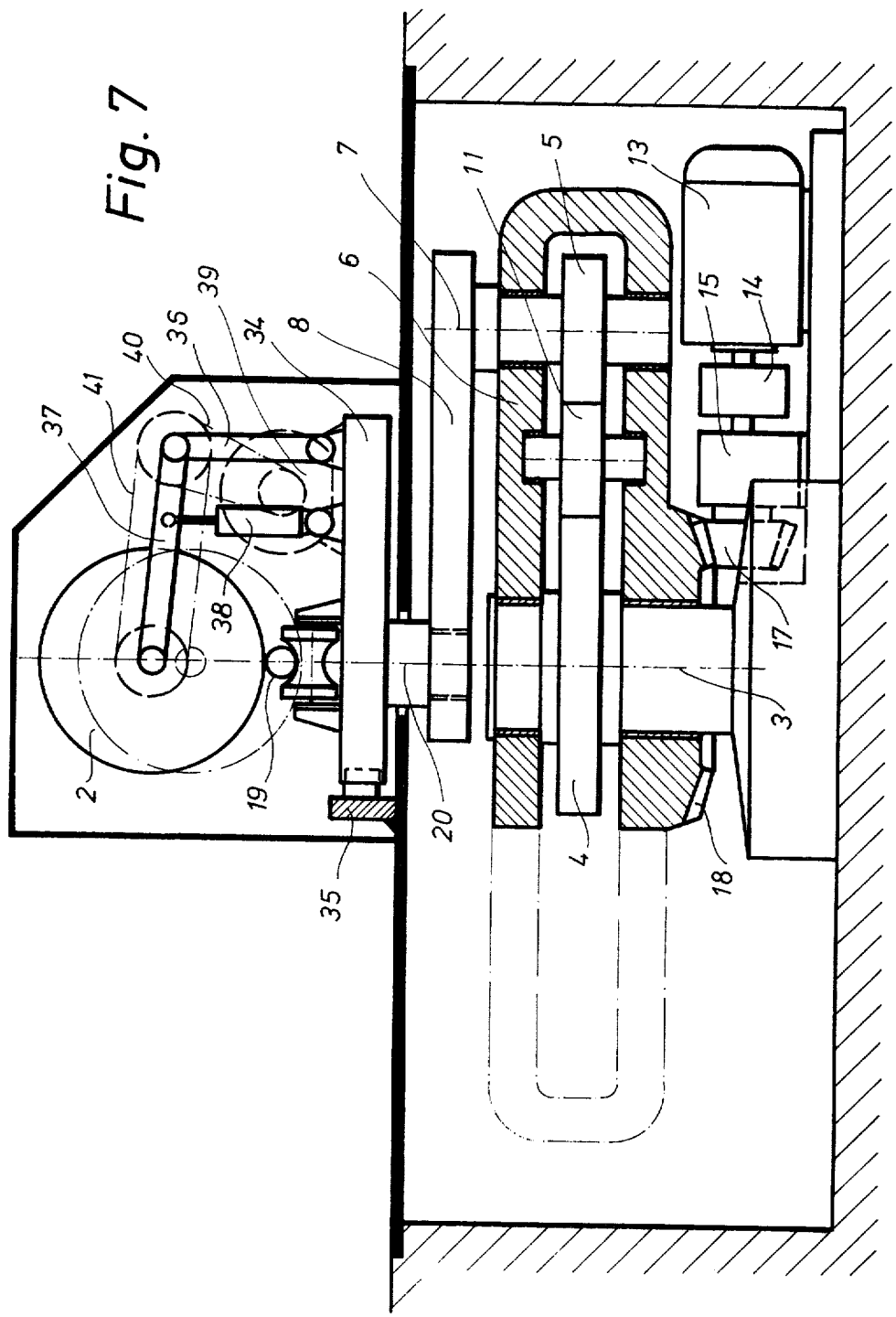
FIG. 7 is a cross-section of the embodiment of FIG. 5 shown in greater detail.

Since the locus 1 in the embodiment of FIG. 5 is a straight line, the cutting feed movement of the saw blade 2 must be effected by means of a special feed device. A cutting device incorporating such a feed device is illustrated in FIG. 7 which embodies the linkage system of FIG. 5. The rocking shaft 20 is disposed on the carrier arm 8, the second lever of the linkage system. The rocking shaft 20, however, does not carry the saw blade 2 directly but a guide plate 34, which is guided in a longitudinal direction of the stock 19 by a rectilinear guide bar 35 to prevent any rotational movement about itself. The saw blade 2 is carried on this guide plate 34 by a support 36 and a lever 37. A hydraulic cylinder 38 effects the feed movement of the saw blade 2 towards the stock. The saw blade 2 is driven by a driving motor 39, for example by means of V-belt drives 40 and 41.

Figure 8:
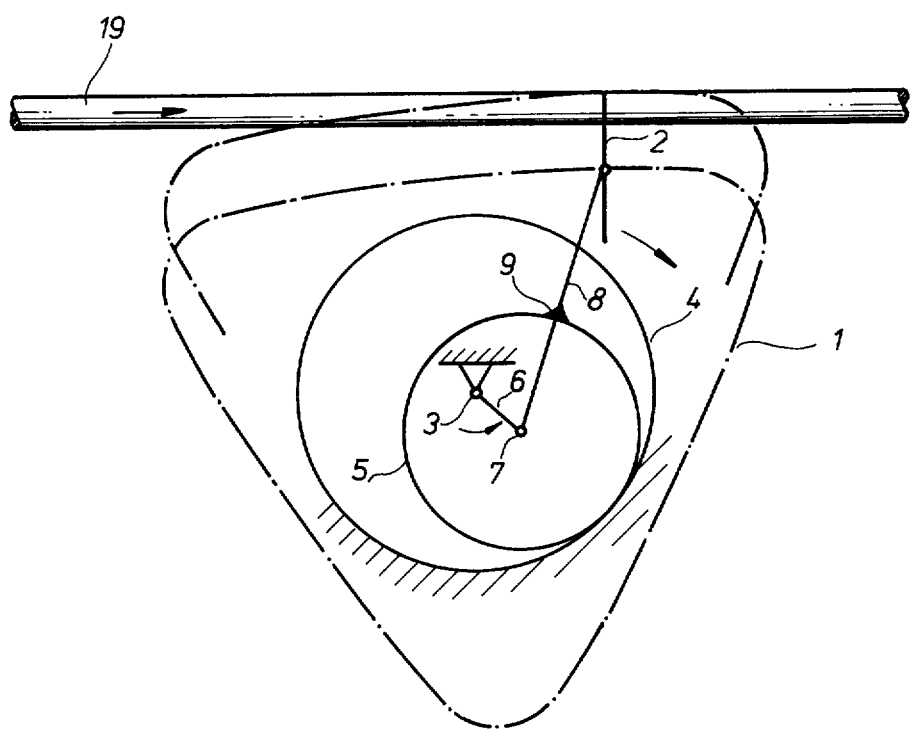
FIG. 8 is a schematic representation of a linkage drive system similar to that of FIG. 1 with a smaller diameter of internal gear and a larger diameter of external drive gear.
Figure 9:
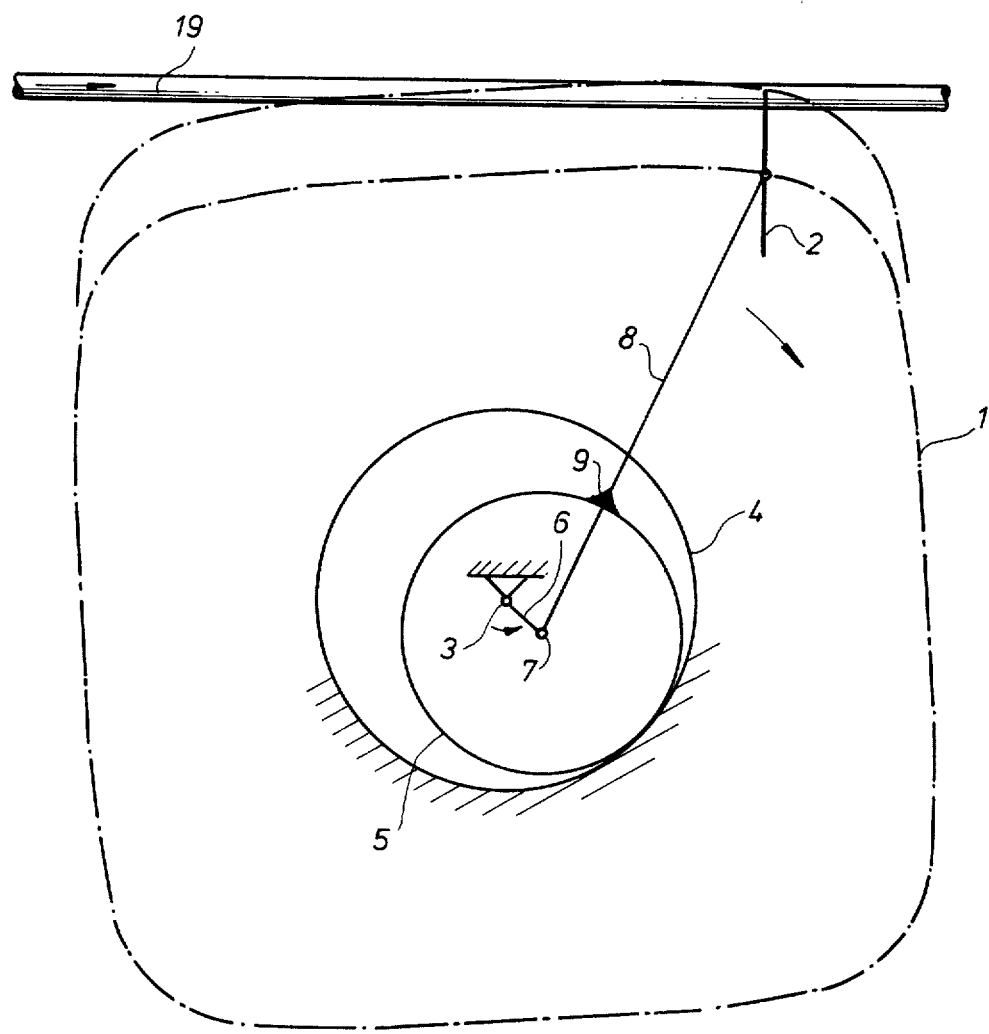
FIG. 9 is a schematic representation of a linkage drive system similar to FIGS. 1 and 8 but having a still larger diameter external drive gear in relation to the internal gear diameter.

FIGS. 8 and 9 illustrate linkage systems which differ from that of FIG. 1 only in that the transmission ratio between the fixed wheel 4 — which may be a ring gear — and the guide wheel 5 in the linkage system of FIG. 8 is 3:2 and in the linkage system of FIG. 9 is 4:3. In these ways, the illustrated triangular and square loci 1 are obtained. Otherwise identical reference numerals are again used for identical parts.

Figure 10:
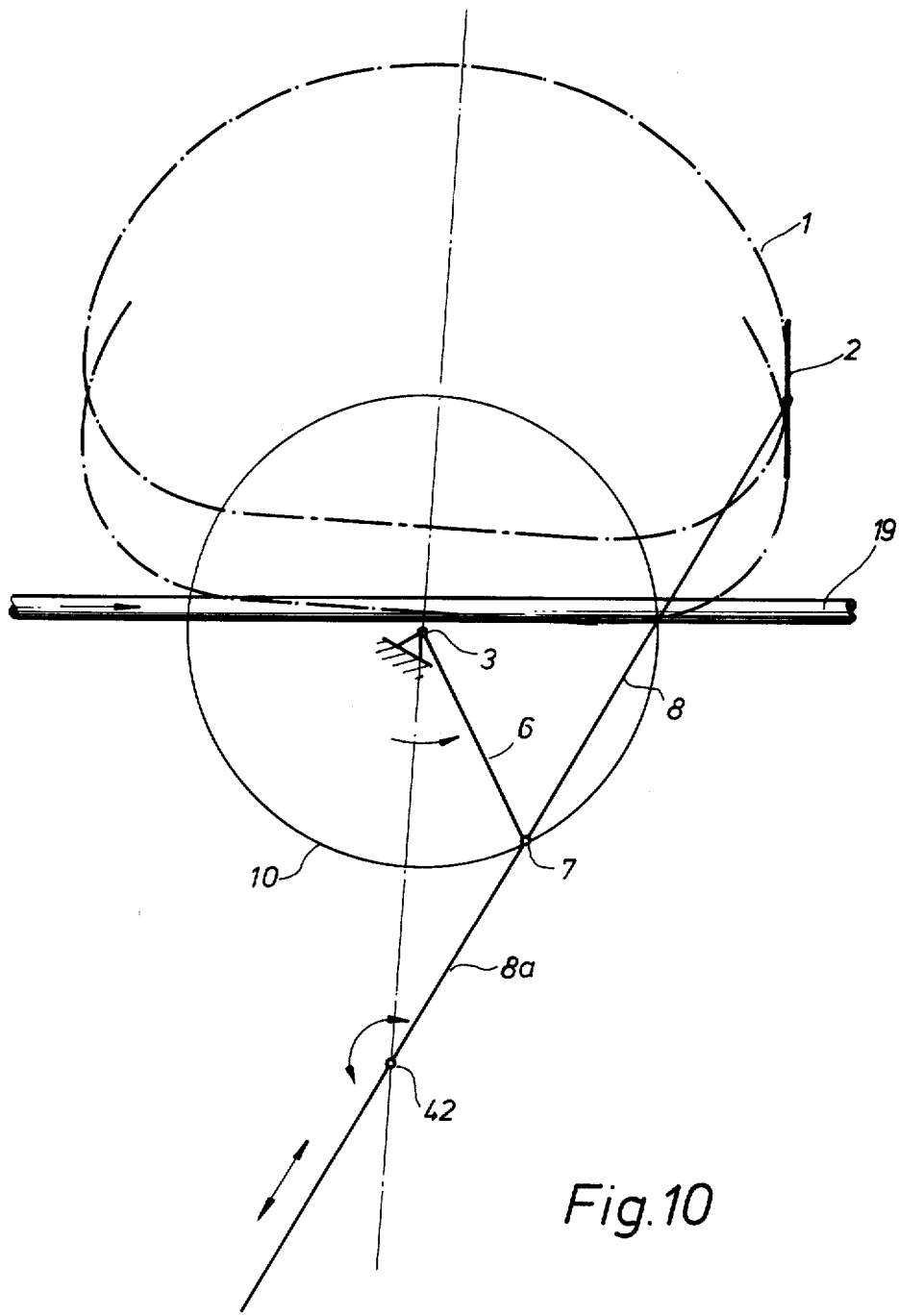
FIG. 10 is a plan view of a linkage system having a pivoted guide bearing and an extended carrier arm.

FIG. 10 shows another embodiment which is, however, based on the same principle. In this case, instead of the guide wheel 5, the linkage system includes a pivoted guide bearing 42 which is at a fixed location during normal operation and in which an extended lever arm 8a of the carrier arm 8 is pivotably as well as axially displaceably supported. Thus, a somewhat kidney-shaped locus 1 is obtained whose location and shape can be varied by altering the location of the pivoted guide bearing 42 relatively to the fixed axis of rotation 3.

Figure 11:
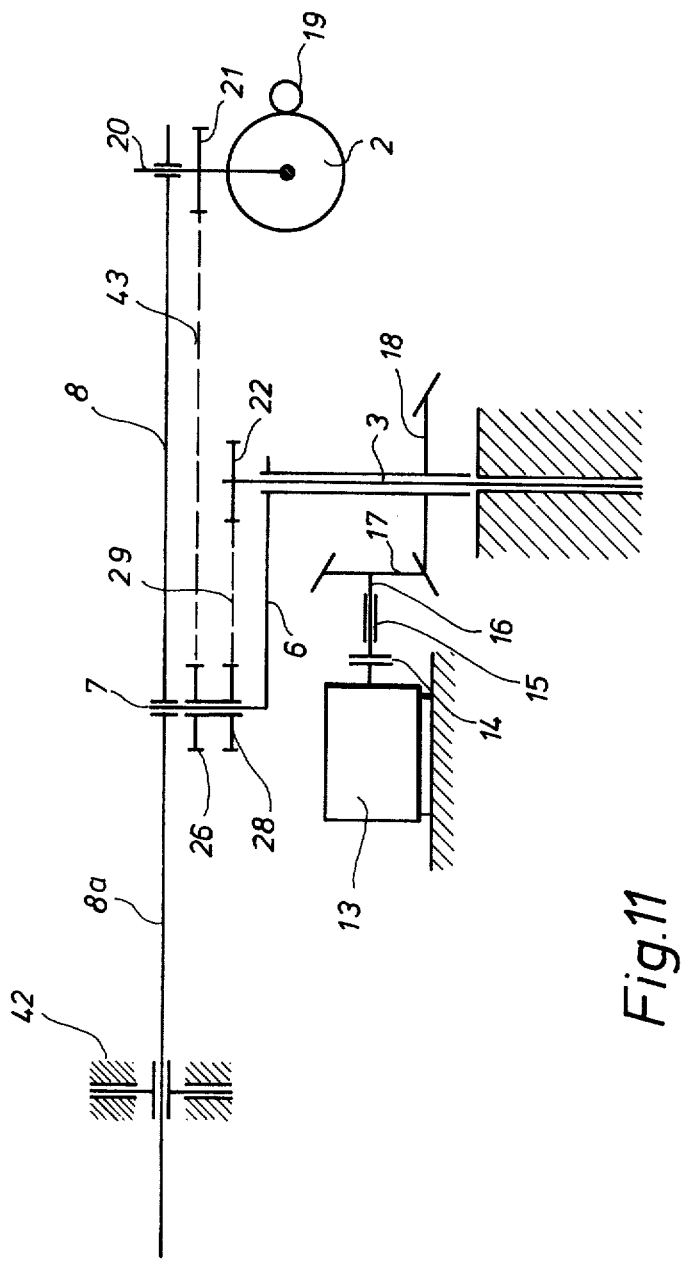
FIG. 11 is a diagrammatic vertical cross-section of an embodiment including the system of FIG. 10 having a device for guiding a cutter along a straight line.

FIG. 11 shows the drive of the linkage system of FIG. 10, this drive being similar to the drive of FIG. 4. Comparison of the reference numerals makes this clear. The fixed wheel 4 and the guide wheel 5 are however no longer present. In this instance too, a straight line or parallel plane guiding device for the saw blade 2 is used but is likewise modified on account of the differently constructed linkage system. The setting wheel 22, the nonslip transmission means 29, 28, 26 and the swivel wheel 21 are clearly visible. Instead of the transmission shaft 24, a second chain or gear belt drive 43 is provided in this embodiment.

Figure 12:
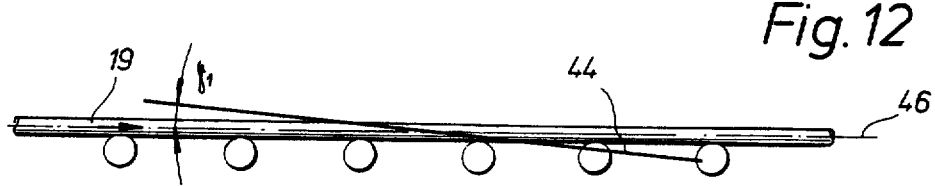
FIG. 12 illustrates an arrangement according to this invention in which the plane of the linkage system is angled in relation to the horizontal product centerline.
Figure 13:
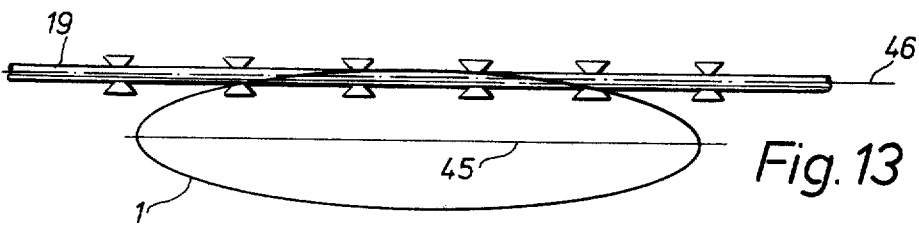
FIG. 13 is a top view of the arrangement of FIG. 12.
Figure 14:
FIG. 14 illustrates and arrangement in which the plane of the linkage drive system is angled in relation to the horizontal product, center line, and the longitudinal axis of the linkage system is also angled.
Figure 15:
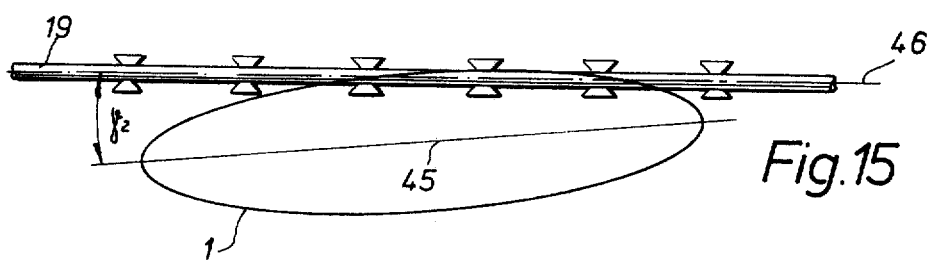
FIG. 15 is a top plan view of the arrangement of FIG. 14.
Figure 16:
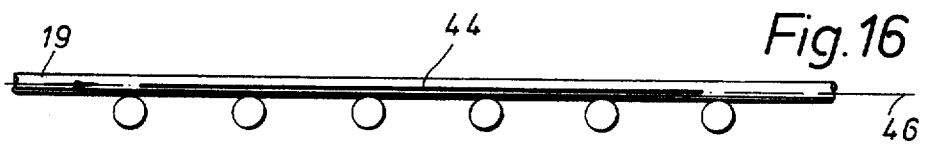
FIG. 16 illustrates an arrangement in which the plane of the linkage drive is horizontally parallel with the product center line, but at an angle to it in the plane configuration.
Figure 17:
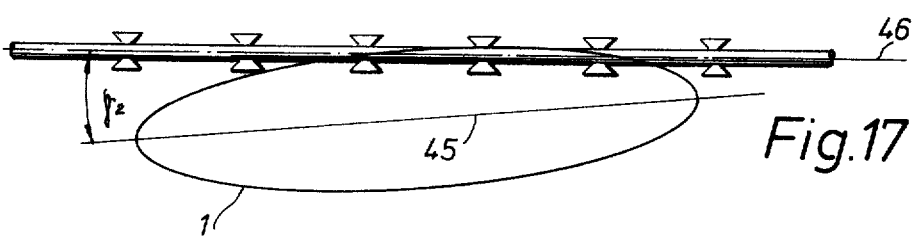
FIG. 17 is a top plan view of FIG. 16.

FIGS. 12 and 13 show that a plane 44 of the linkage system, seen in side view, can be inclined at an angle $\gamma_1$ relative to longitudinal axis 46 of the stock 19 whilst the large half axis of the locus 1, which is indicated by 45, extends parallel to the longitudinal axis 46 of the stock 19, as can be seen in FIG. 13 which is the top view of FIG. 12. The arrangement shown in FIGS. 14 and 15 basically corresponds to that of FIGS. 12 and 13 with the exception that the large half axis 45 of the locus 1, in the plan view also, is inclined at an angle $\gamma_2$ relative to the longitudinal axis 46 of the stock 19. In the arrangement of FIGS. 16 and 17, the plane 44 of the linkage system extends horizontally through the longitudinal axis 46 of the stock 19 and the large half axis 45 of the locus 1 extends inclined at the angle $\gamma_2$, relative to the longitudinal axis 46 of the stock 19. Besides the arrangements which have been mentioned above by way of example, numerous other arrangements are conceivable as well as numerous other embodiments of the cutting device.

A cutting device embodying the present invention can be capable of subdividing moving elongated stock at relatively high speeds. Stock speeds greater than 10m/sec, for example 20m/sec, are contemplated.

Figure 18:
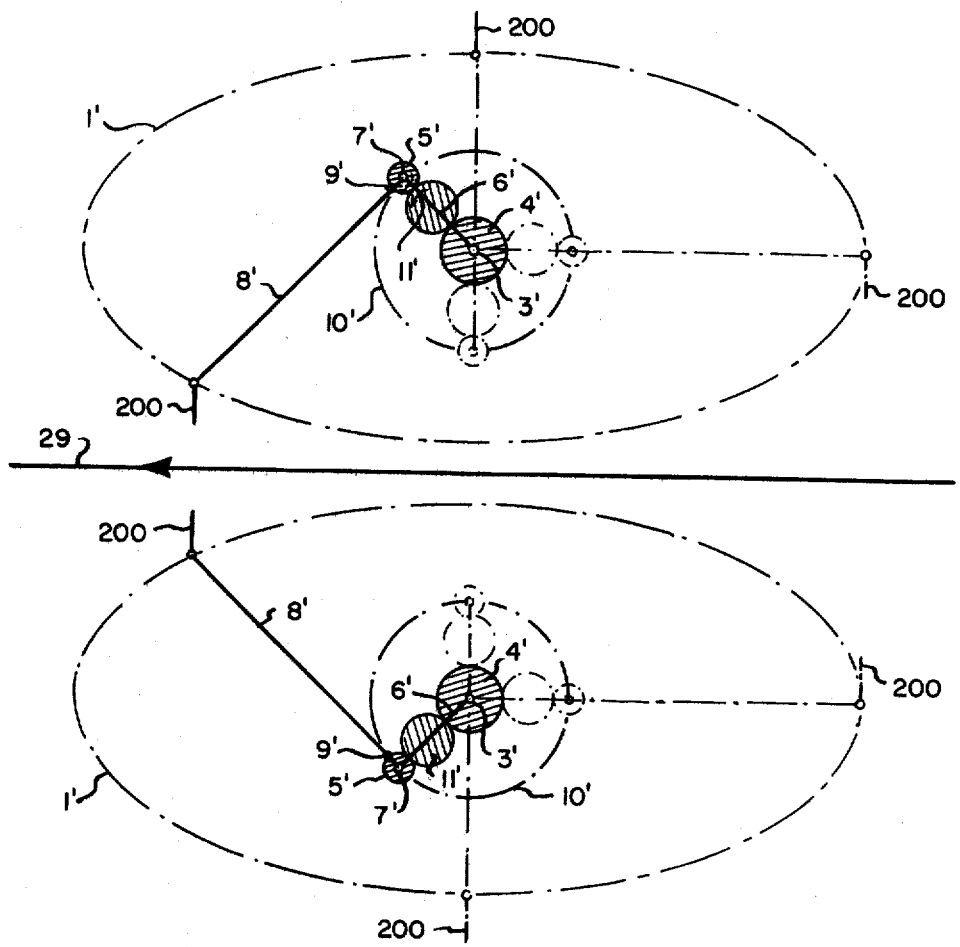
FIG. 18 is a schematic representation of an embodiment of this invention incorporating two linkage systems and shearing blades.

In FIG. 18 we have illustrated a system using shear blades 200 instead of the cutting wheels 2 described above. This embodiment uses two linkage systems and is illustrated in the form of the system of FIG. 2 with a mirror image system in which like parts to those of FIG. 2 bear like numerals with the prime suffix. In this system shear blades 2 intersect and overlap in the manner of shears on the minor axis of the side by side systems.

What we claimed is:

1. A cutting device for subdividing moving elongated stock, especially strip- or rod-shaped or tubular rolled stock, in which each cutting tool moves in a substantially flat curve through a cutting zone during cutting and through a relatively sharp curve at each end of the cutting zone comprising a cutting tool, a carrier arm pivotally mounted at one end and free at the other, said cutting tool disposed on a free end section of said carrier arm which, when in use, describes a locus first guide means acting on said carrier arm by which it can be guided to and through the stock at a speed which at least over the length of a stock cutting path is synchronised with the speed of the stock, a linkage system of at least two levers in which the carrier arm is the last lever, all of which are effectively in the same plane, and which are pivotally connected one to another, one end of a first lever of the linkage system remote from the carrier arm being mounted for rotation about a fixed axis, a second lever in the linkage system being pivotally connected to the first lever about a common pivotal axis spaced from the fixed axis and second guide means are coupled to the second lever so that, when in use, the first lever, and with it the common pivotal axis, is rotated in a circular path about the fixed axis of rotation whilst part of the second lever in the region of the common pivotal axis also is rotated in the circular path but in addition is caused by the second guide means to pivot about the rotating common pivotal axis.

2. A cutting device as claimed in claim 1, in which the carrier arm is the second lever of the linkage system.

3. A cutting device as claimed in claim 2, in which the second guide means comprises a toothed guide wheel rotatable about the common pivotal axis between the first and second levers and to which the second lever is connected in a non-rotating manner, and a toothed wheel or ring gear which is disposed concentrically about the fixed axis of rotation and is fixed during normal operation, and by which the guide wheel is driven as a result of rotation of one of the first lever, the toothed wheel and the ring gear about the fixed axis of rotation.

4. A cutting device as claimed in claim 3, in which the guide wheel is in direct engagement with the toothed wheel or ring gear which is fixed during normal operation and which is internally toothed.

5. A cutting device as claimed in claim 3, in which the guide wheel is in indirect engagement with the toothed wheel or ring gear.

6. A cutting device as claimed in claim 5, in which the indirect engagement is through at least one intermediate gear wheel.

7. A cutting device as claimed in claim 5, in which the indirect engagement is through at least one chain or gear belt drive.

8. A cutting device as claimed in claim 5, in which the toothed wheel or ring gear is externally toothed and is fixed during normal operation.

9. A cutting device as claimed in claim 3, in which the transmission ratio between the toothed wheel or ring gear rim and the guide wheel is 2:1.

10. A cutting device as claimed in claim 3, in which the transmission ratio between the toothed wheel or ring gear and the guide wheel is 3:2.

11. A cutting device as claimed in claim 3, in which the transmission ratio between the toothed wheel or ring gear and the guide wheel is 4:3.

12. A cutting device as claimed in claim 4, in which the ratio of the lengths of the first and second levers lies between approximately 1:1.1 and 1:16.5.

13. A cutting device as claimed in claim 9, in which the first and second levers are substantially equal in length.

14. A cutting device as claimed in claim 13, in which a special feed device is disposed on the carrier arm for moving the cutting tool relative to the carrier arm into and out of a cutting position and/or for effecting the cutting feed.

15. A cutting device as claimed in claim 3, in which the toothed wheel or ring gear which is fixed during normal operation is rotatable about its centre, therefore about the fixed axis of rotation, and is lockable in any position.

16. A cutting device as claimed in claim 1, in which the second guide means comprises a pivoted guide bearing whose location is fixed during normal operation, and an extension of the second lever which extends beyond the pivotal axis common to the first and second levers and which is pivotably and axially displaceably supported in the pivoted guide bearing.

17. A cutting device as claimed in claim 16, in which the pivoted guide bearing is adjustable towards or away from the axis of the moving stock.

18. A cutting device as claimed in claim 16, in which the pivoted guide bearing is adjustable in a direction approximately parallel to the axis of the moving stock.

19. A cutting device as claimed in claim 1, in which the plane of the linkage system extends in to a plane extending through the longitudinal axis of the moving stock.

20. A cutting device as claimed in claim 1, in which the plane of the linkage system, regarding the cutting device in cross-section, extends at an angle to a plane extending through the longitudinal axis of the moving stock.

21. A cutting device as claimed in claim 1, in which the plane of the linkage system, regarding the cutting device in cross-section, extends substantially perpendicular to a plane extending through the longitudinal axis of the moving stock.

22. A cutting device as claimed in claim 1, in which, when operated intermittently on a start-stop basis, the stop point of the cutting tool and the carrier arm is in a region of the locus in which these parts have their lowest speed.

23. A cutting device as claimed in claim 1, in which each cutting tool is connected to a straight line or parallel plane guiding device for alignment on the carrier arm into its cutting direction relative to the stock.

24. A cutting device as claimed in claim 23, in which the straight line or parallel plane guiding device has a setting wheel, which is disposed coaxially with the fixed axis of rotation and is stationary during normal operation, and a swivel wheel which is connected in a non-rotational manner to a rocking shaft supporting the tool on the carrier arm, and between such wheels non-slip transmission means for transmitting rotational movement extending from the setting wheel along the first lever to the common pivotal axis between the first and second levers, along said axis and along the second lever to the swivel wheel, the transmission ratio between the setting wheel and the swivel wheel being 1:1.

25. A cutting device as claimed in claim 23, in which a guide wheel is provided as an additional guide means, and the straight line guiding device has a setting wheel which is disposed coaxially with the common pivotal axis between the first and second levers and is connected in a non-rotational manner to the first lever, and a swivel wheel which is connected in a non-rotational manner to a rocking shaft supporting the tool on the carrier arm, and between such wheels non-slip transmission means for transmitting rotational movement extending from the setting wheel along the carrier arm to the swivel wheel, the transmission ratio between the setting wheel and the swivel wheel corresponding exactly to the inverse ratio between the toothed wheel or ring gear rim which is fixed during normal operation and the guide wheel.

26. A cutting device as claimed in claim 23, in which an additional adjusting device acts upon the straight line guiding device and by actuating the rocking shaft swivels the cutting tool through a limited angle out of its cutting position.

27. A cutting device as claimed in claim 26, in which the additional adjusting device acts upon the setting wheel of the straight line guiding device.

28. A cutting device as claimed in claim 1, in which two synchronised linkage systems are provided disposed on opposed sides of the stock.

29. A cutting device as claimed in claim 28, in which the cutting tools comprise shearing blades.

30. A cutting device as claimed in claim 1, in which the or each cutting tool comprises a circular saw blade.

* * * * *